United States Patent [19]

Scully

[11] Patent Number: 4,809,285
[45] Date of Patent: Feb. 28, 1989

[54] CORRELATED EMISSION LASER

[75] Inventor: Marlan O. Scully, Estancia, N. Mex.

[73] Assignee: University of New Mexico, Albuquerque, N. Mex.

[21] Appl. No.: 942,498

[22] Filed: Dec. 15, 1986

[51] Int. Cl.$^4$ ............................................. H01S 3/00
[52] U.S. Cl. ........................................ 372/33; 372/97
[58] Field of Search ................... 372/69, 27, 28, 33, 372/91, 92, 97

[56] References Cited

U.S. PATENT DOCUMENTS 3,855,544 12/1974 Bowness ............................. 372/97

OTHER PUBLICATIONS

*An Overview of Passive Optical "Gyros"*, S. Ezechiel, SPIE J., p. 13, (1984).
*Correlated Spontaneous-Emission Lasers: Quenching of Quantum Fluctuations in the Relative Phase Angle*, M. Scully, Phys. Rev. Lett. 55, p. 2802 (1985).

*Primary Examiner*—William L. Sikes
*Assistant Examiner*—B. Randolph
*Attorney, Agent, or Firm*—Deborah A. Peacock; Robert W. Weig

[57] ABSTRACT

Method and device for correlating the spontaneous emission of photons into laser fields. Atoms of a common lasing medium of multiple laser fields are excited into a coherent superposition of upper levels. When photons are emitted into the laser fields, these emissions are coherent or correlated. The method and correlated emission laser of the invention utilize this correlation to quench the spontaneous emission noise inherent in active laser systems.

10 Claims, 3 Drawing Sheets

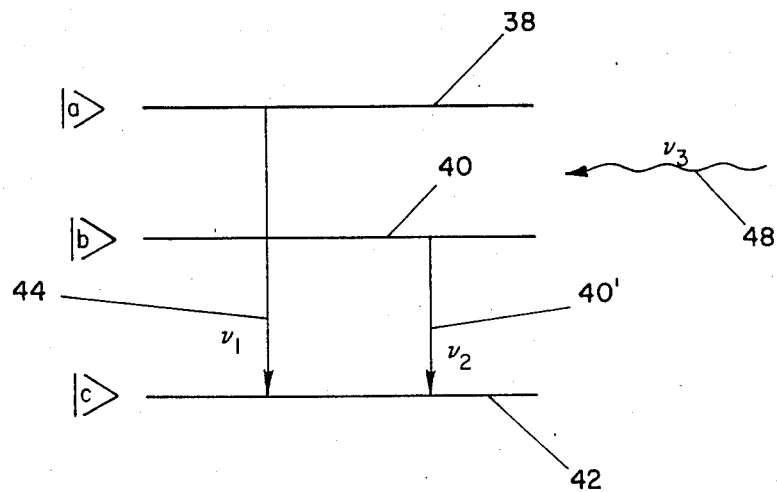
FIG—3
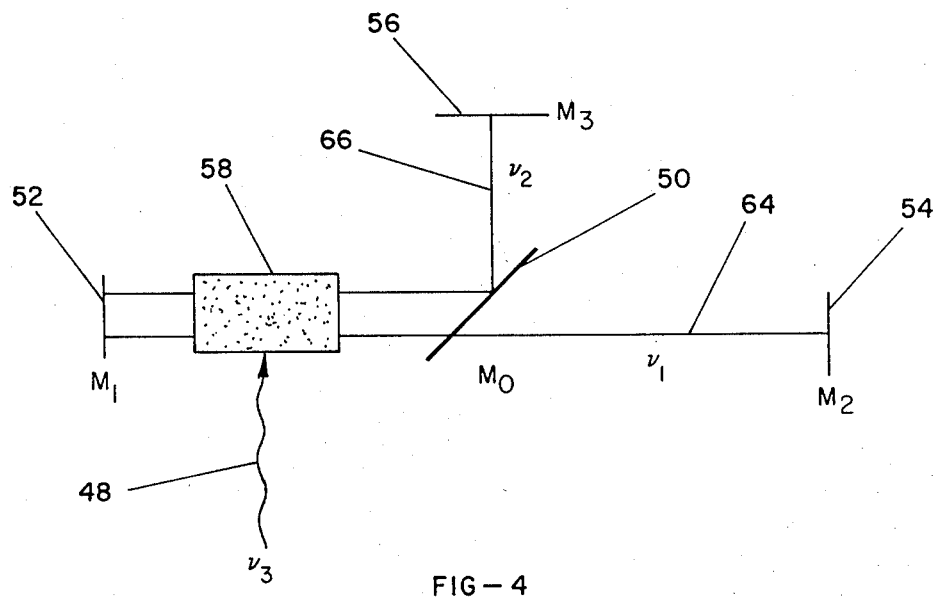
FIG—4

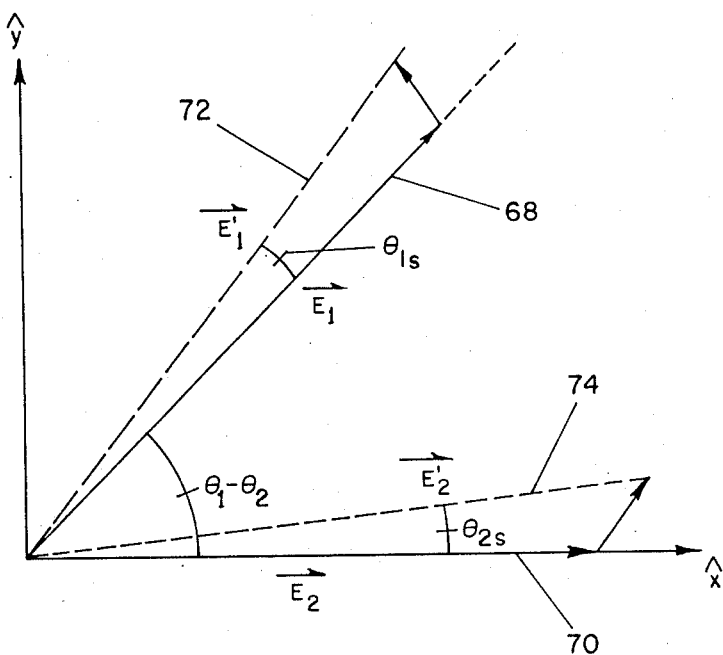
FIG—5
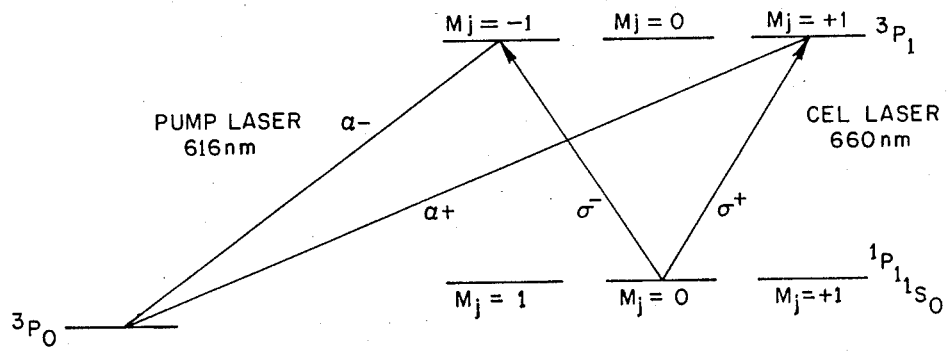
FIG — 6

CORRELATED EMISSION LASER

This invention was made with Government support under AFOSR Grant 85-0109 awarded by the United States Air Force. The Government has certain rights in this invention. The United States Government has rights in this invention pursuant to a Contract awarded by the Department of the Navy.

BACKGROUND

This invention relates to a method and laser system for correlating the spontaneous emission of photons and thereby quenching the noise due to spontaneous emission in laser fields.

High-precision or high-sensitivity laser interferometers are finding increasing use in the detection of small length or frequency perturbations. Some optical length perturbation sources or length modulation sources are: gravity waves, variations in the index of refraction, temperature fluctuations, and mechanical vibrations. There have been prior attempts to detect extremely small perturbations due to gravitational radiation, but these attempts have been unsuccessful. The frequency of gravitational radiation is typically in the range of $10^{-2}$ to $10^4$ Hz, and the strength of gravitational radiation is typically in the range of $10^{-17}$ to $10^{-26}$ (dimensionless amplitude; the ratio of the change in proper distance ($\Delta L$) between two free masses to the nominal length ($L$)). Gravitational radiation is a result of astronomical events, such as the formation of black holes, supernovae, or rotating binary stars. To detect this radiation, extremely sensitive lasers are required.

There are two standard types of laser interferometers; passive and active laser systems. The sensitivities of both types of laser systems are approximately the same. The signal power for an active laser device is independent of the length of the device, whereas the signal for a passive laser device is a linear function of the arm lengths of the interferometer. Active laser systems have a larger signal than passive laser systems, but are hindered by larger noise sources. These factors result in essentially identical quantum limits for both prior art systems.

Passive laser systems have been used in the prior art to attempt the detection of gravitational radiation. Currently, there is a joint project between M.I.T. and Caltech to build two, five-kilometer long, passive laser interferometers to yield evidence of and information on gravitational radiation. In passive laser systems, generally one laser and a beamsplitter is utilized to produce two perpendicular beams. The length between the beamsplitter and one of the mirrors is fixed (this is the distance traversed by the "reference" or "standard" beam) and the other length (this is the distance traversed by the "signal" beam) is allowed to be influenced by an external force. When there are no external forces, the phase difference (at the photodetector) between the two beams produced by the beamsplitter will be constant. However, an external force, i.e., the effect to be measured, causes a change in the length traversed by the "signal" beam but not that traversed by the "standard" beam. Either length could change as long as it did so in a different manner. In the case of the passage of gravitational radiation, differential change occurs because the gravity wave only affects distances which have a component perpendicular to the direction of the propagation of the wave. Thus the interferometer can be situated such that only the "signal" length has a component perpendicular to the direction of the passing gravitational radiation.

A change in length for a passive laser system is represented by the following equation:

$$L + \Delta L = L\left(1 + \frac{h}{2} \sin \omega t\right) \qquad \text{Equation 1}$$

in which "$\Delta L$" is the magnitude of the length modulation of an interferometer arm when affected by a perturbation source, "$L$" is the original length, "$h$" is a dimensionless parameter which characterizes the strength of the perturbation source, "$\omega$" is the frequency of the perturbation source, and "$t$" is the time. As can be seen from Equation 1, for very small perturbation sources which are characterized by low strengths and low frequencies, the effect of the length modulation ($\Delta L/L$) is very small, and often cannot be detected with the use of prior art passive laser means and devices. Gravitational radiation has not yet been detected in the prior art. Passive laser systems are limited in their sensitivity and thus detection ability due to their small signals and noise present in the laser system. The limiting noise in passive laser systems is generally "shot noise" which is associated with the imperfect conversion of photons to photoelectrons at the photodetector.

Active laser systems, which generally comprise two laser modes or fields, generate a larger signal and thus can feasibly detect minor perturbation sources more easily than passive systems. Active laser interferometers operate on the principle that a laser field will oscillate at a frequency equal to one of the frequencies of the laser cavity. Generally, two lasers in an active system are positioned perpendicular to each other. One of the lasers typically serves as a "reference" or "standard" laser; this reference laser has a fixed cavity length and thus a fixed frequency. When a perturbation source passes the other laser ("signal" laser) there is a change in the cavity length, resulting in a change in the laser frequency. This change in frequency is then detected by beating or heterodyning the signal laser against the stable reference laser. An electronic current is produced which oscillates at the frequency difference between the two lasers; this information is typically resolved by conventional electronics.

The frequency change for an active laser system is represented by the following equation:

$$\Delta \nu = \nu \frac{\Delta L}{L} \qquad \text{Equation 2}$$

in which "$\Delta \nu$" is the change in frequency due to the perturbation source, "$\nu$" is the original frequency, "$\Delta L$" is the change in cavity length, and "$L$" is the original cavity length. As can be seen from Equation 2, a small change in cavity length results in a relatively large frequency shift. Thus, the cavity length does not need to be as long as with a passive laser system (tabletop length compared to hundreds of meters long for a passive system). Therefore, an active laser system, being smaller than a comparable passive laser system, is generally preferable for detection purposes.

Active laser systems, however, have greater environmental disturbances or "noise" than passive systems which limits their sensitivity. Both types of laser systems (passive and active) have noise largely due to mechanical vibrations which tend to move the mirrors, and temperature fluctuations in the lasing medium which tend to change the beam length and thus the length stabilization of the system. Prior art means have been fairly effective in eliminating the effects of these major types of noise.

Shot noise is a primary source of noise in active laser systems; however, a more limiting source of noise in active systems is due to the random nature of spontaneous emission which is intrinsically present in the laser cavity along with the much more dominant stimulated emission. Spontaneous emission noise causes the phase of an active laser system to randomly drift. (Such a drift in a passive system is not considered "noise" because both beams are equally affected and the drift is thus compensated for.) If this random drift has a larger amplitude than the deterministic laser signal, information about the physical parameters of a perturbation source cannot be reliably determined. Attempts in the prior art to quench or eliminate the effects of simultaneous emission noise in active laser systems have been unsuccessful.

Accordingly, it is a primary object of the present invention to provide a method for eliminating the effects of spontaneous emission noise in active laser systems.

Another object of the present invention is to provide improved active laser interferometers having high precision for use in detecting minor perturbations sources, such as gravity waves.

Other objects and further scope of applicability of the present invention will become apparent from the detailed description to follow, taken in conjunction with the accompanying drawing.

SUMMARY OF THE INVENTION

This invention relates to a method and laser systems which utilize this method to quench the effects of spontaneous emission noise in active laser devices. Use of the invention results in high-precision detection and measurement of phase differences between two laser fields such as is needed in active laser interferometers.

Random spontaneous emissions from two or more laser fields are correlated in accordance with the invention so that the noise due to such emissions is eliminated. The method of the invention for correlating these spontaneous emissions comprises exciting photons or atoms to two distinguishable upper states or levels, or in other words, into a coherent superposition, and detecting the relative phase angle among the resulting electromagnetic fields. When the photons make a transition to a lower state, the emissions are still random and cause a phase drift, but the drifts are correlated. The relative phase drift or angle between the fields thus becomes a constant or zero, and the spontaneous emission noise is thereby quenched.

The preferred method of the invention for correlating emissions utilizes the Hanle effect in which atoms are excited to upper states which have the same energy level, but distinguishable states of polarization. An alternative method of the invention utilizes the quantum beat technique in which atoms are excited to distinguishable upper energy levels and emit at different frequencies. As the atoms spontaneously emit into the laser fields, the phase of each field tends to drift, thereby creating spontaneous emission noise. However, both fields drift equally because they have been coherently excited.

Thus, the relative phase angle between the fields is a constant, the emissions are correlated, and this type of noise is quenched.

The laser systems of the invention comprise a laser source, means for producing at least two laser fields, a common lasing medium for the laser fields, mirrors for transmitting and reflecting laser fields, and an external coherence inducing source. The preferred laser system of the invention utilizes the Hanle effect. In this system, the external coherence inducing source is a source which produces different states of polarization among the laser fields. An alternative laser system of the invention utilizes a "quantum beat" technique. In this system, the external coherence inducing source is a source which produces different frequencies among the laser fields.

BRIEF DESCRIPTION OF THE DRAWING

FIG. 3 of the drawing illustrates the quantum beat method of the invention for correlating spontaneous emissions in laser fields;

FIG. 4 of the drawing illustrates an alternative laser system of the invention which utilizes the quantum beat method;

FIG. 5 of the drawing is a graph which illustrates the correlation of the relative phase drift between two laser fields; and FIG. 6 of the drawing shows a Hanle effect pump medium used in accordance with the invention.

DESCRIPTION OF THE PREFERRED EMBODIMENT

This invention relates to methods and devices for quenching or eliminating the effects of spontaneous emission noise in active laser systems. In order to eliminate the noise effects due to spontaneous emission in active laser systems, the invention establishes a correlation between the random spontaneous emission events of multiple laser fields. This correlation is achieved by utilizing a common lasing or gain medium. Atoms are excited from a lower level into a coherent superposition of upper levels. When the atoms make a transition from the upper levels to the lower level, their emissions, although random, are now coherent with each other. Thus, the noise effects are quenched from their relative phase.

Figure 1:
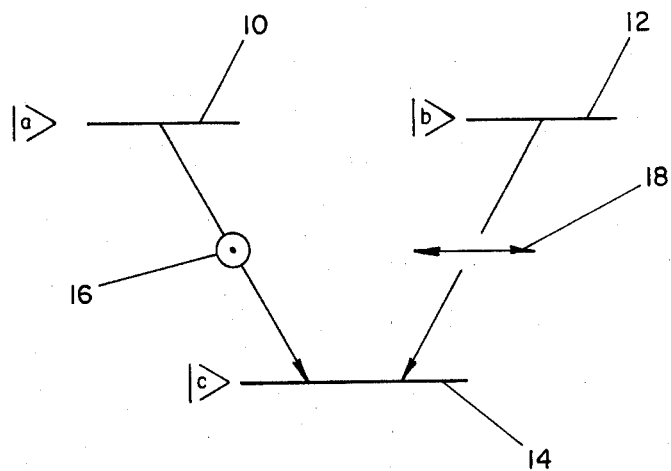
FIG. 1 of the drawing illustrates the Hanle effect method of the invention for correlating spontaneous emissions in laser fields.
Figure 2:
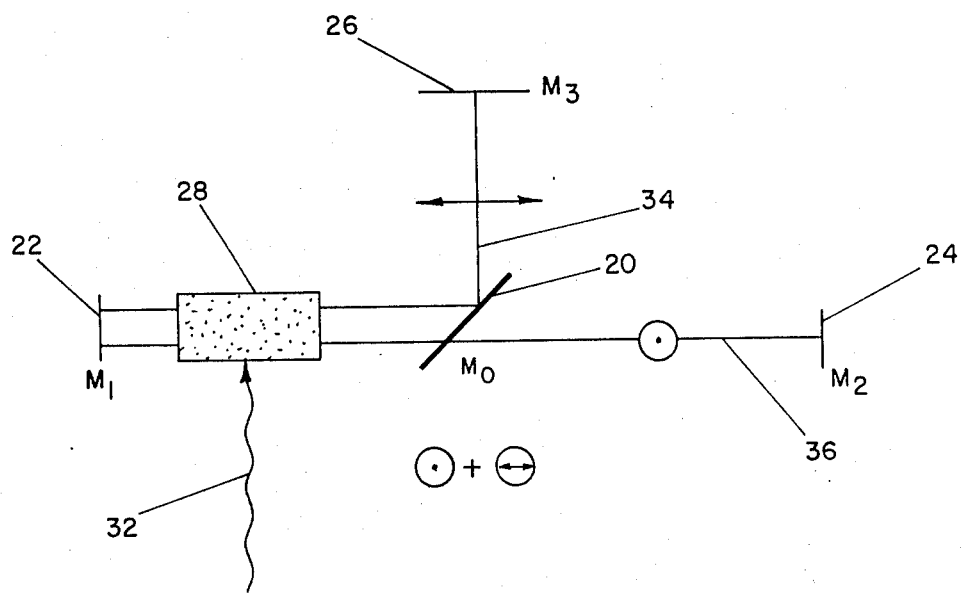
FIG. 2 of the drawing illustrates the preferred laser system of the invention which utilizes the Hanle effect method.

The drawing illustrates the preferred methods of the invention for correlating spontaneous emission of two laser fields. FIGS. 1 and 2 illustrate the correlation of spontaneous emissions of two laser fields using polarization induced coherence (the "Hanle effect" method). FIGS. 3 and 4 illustrate the correlation of spontaneous emissions of two laser fields using frequency induced coherence (the "quantum beat" method).

FIGS. 1 and 2 are described in detail, as follows. As shown in FIG. 1, two upper states $|a\rangle 10$ and $|b\rangle 12$ are excited from a single elliptical polarization state $|c\rangle 14$, into coherent superposition. These upper states $|a\rangle 10$ and $|b\rangle 12$ are at the same energy level, but have different polarization components. In other words, the upper states are degenerate and differ in their magnetic quantum number. When an atom makes a transition to the lower state $|c>$ 14 from the upper state $|a>$ 10, and another atom makes a transition to the lower state $|c>$ 14 from the upper state $|b>$ 12, both transitional states radiate coherently and their polarization components are fixed relative to each other. FIG. 1 shows the direction of polarization 16 of the $|a>$ 10 to $|c>$ 14 transition to be perpendicular to the direction of polarization 18 of the $|b>$ 12 to $|c>$ 14 transition. Thus, these two emissions can be distinguished by detecting their difference in polarization.

FIG. 2 illustrates a preferred device or laser system of the invention which utilizes the Hanle effect method (shown in FIG. 1) to correlate emissions. As used throughout this specification, this laser system is referred to generally as a "correlated emission laser," and more specifically as a "Hanle effect" laser. The laser system comprises a central mirror $M_0$ 20; end mirrors $M_1$ 22, $M_2$ 24, and $M_3$ 26; a single lasing medium or source 28; and an external polarization inducing source or pump field 32. The field in the system comprises two laser fields 34 and 36 which share the same atomic lasing medium 28 but occupy different optical cavities, hereinafter referred to as "doubly resonant cavity." The first laser field 34 has polarization components which are different from the polarization components of the second laser field 36 due to the polarization inducing source. As shown in FIG. 2, the polarization components of the first laser field 34 are perpendicular to the polarization components of the second laser field 36. FIG. 2 shows perpendicular polarization components for the two fields; however, any angular difference in polarization between the two fields which could be detected may be utilized in the invention. Likewise, FIG. 2 shows only two fields with differing planes of polarization for simplicity. Additional fields with differing planes of polarization could be utilized in the invention.

The central mirror $M_0$ 20 is preferably a polarization splitter which transmits light with one plane of polarization 36 and reflects light having a different plane of polarization 34. The external polarization inducing source 32 impinges upon the lasing medium 28 to prepare the upper atomic states $|a>$ 10 and $|b>$ 12 (see FIG. 1) of both fields into coherent superposition. This results in the elimination of spontaneous emission noise, as explained below and in FIG. 5. A typical polarization inducing source, which is useful in the present invention, is an external elliptically polarizing laser.

FIGS. 3 and 4 illustrates the use of the quantum beat method of the invention. In this method, the laser fields comprise a three-level atomic medium in which $|a>$ 38 represents an upper excited atomic state, $|b>$ 40 represents a lower excited atomic state, and $|c>$ 42 represents the ground atomic state. When an atom makes a transition from the upper excited state $|a>$ 38 to the ground state $|c>$ 42, a photon of frequency $\nu_1$ 44 is emitted. Similarly, when an atom makes a transition from the lower excited state $|b>$ 40 to the ground state $|c>$ 42, a photon of a different frequency $\nu_2$ 46 is emitted. If an external frequency $\nu_3$ 48, which is approximately equal to $\nu_1-\nu_2$, or in other words nearly resonant with the $|a>$ to $|b>$ atomic transition, is introduced into the three-level atomic medium, the excited states ($a>$ and $b>$) are prepared in a coherent superposition such that transitions to the ground state from each excited state "couple" or become correlated. The external frequency $\nu_3$ 48 may be provided by microwave or an electric current. This coupling, due to $\nu_3$ 48, strongly correlates the two atomic transitions which can be used to drive a laser cavity.

FIG. 4 of the drawing illustrates an alternative laser system of the invention which utilizes the quantum beat method shown in FIG. 3. As used throughout the specification, this laser is referred to generally as a "correlated emission" laser and more specifically as a "quantum beat" laser. In this alternative embodiment, the laser system comprises a central mirror $M_0$ 50; end mirrors $M_1$ 52, $M_2$ 54, and $M_3$ 56; a single lasing medium or source 58; and an external frequency source $\nu_3$ 48. The field in the system comprises two laser fields 64 and 66 which share the same atomic lasing medium 58 and a doubly resonant cavity. The first laser field 64 oscillates at a frequency $\nu_1$ 44 and the second laser field 66 oscillates at a frequency $\nu_2$ 46 due to the different optical cavity lengths.

The central mirror $M_0$ 50 is preferably a dichroic mirror which transmits light 64 of frequency $\nu_1$ 44 and reflects light 66 of frequency $\nu_2$ 46. The external frequency source $\nu_3$ 48 impinges upon the lasing medium 58. When $\nu_3$ 48 is approximately equal or equal to $\nu_2$ 46 minus $\nu_1$ 44, the upper atomic states $|a>$ 38 and $|b>$ 40 are prepared in a coherent superposition. This results in the elimination of the spontaneous emission noise, as explained below and in FIG. 5.

Although the invention has been described with reference to the Hanle effect and the quantum beat methods for correlating spontaneous emissions, any method may be utilized which excites atoms to at least two upper states having distinguishable components. Moreover, the invention has been generally described as comprising two laser fields for purposes of explanation; however, multiple laser fields can achieve the same results.

FIG. 5 illustrates a random phase shift due to spontaneous emission noise and correlation of two laser field phase shifts or drifts when either laser system of the invention is in operation. Two laser fields $\bar{E}_1$ 68 and $\bar{E}_2$ 70 are represented by the solid lines. These laser fields have two different phases, $\theta_1$ and $\theta_2$. When spontaneous emission noise occurs, the fields drift by phases $\theta_{1S}$ and $\theta_{2S}$ to laser fields $\bar{E}_1'$ 72 and $\bar{E}_2'$ 74. The phase drift is the same for both fields because the two laser fields $\bar{E}_1$ 68 and $\bar{E}_2$ 70 occupy the same lasing medium, and because the spontaneous emission transitions are correlated due to one of the methods discussed above and shown in FIGS. 1-4. In prior art laser systems, these random drifts are not correlated and thus a disturbance caused by a perturbation source cannot be detected unless the disturbance is larger than this drift. The emissions are still random, but the relative phase between these emissions is constant or zero. For the Hanle effect laser (FIGS. 1 and 2), the phases of polarization components are fixed relative to each other. For the quantum beat laser (FIGS. 3 and 4), the phases of frequency components are fixed relative to each other. The two laser fields are differentially affected by external influences and yet the spontaneous emission noise in the relative phase angle between these fields are correlated. Thus, this spontaneous emission noise cancels out and its effects are eliminated. With the elimination or quenching of this type of noise effect, an extremely high precision laser device has therefore been invented which is useful for the detection of very minor perturbances.

As stated previously, an active laser system produces a larger signal and thus can better detect a smaller effect. With the elimination of one of the major effects of noise, spontaneous emission noise, the active laser system of the present invention is superior to both active and passive prior art laser systems. Prior art passive and active laser systems have nearly identical quantum limits. The present invention, on the other hand, has the potential of achieving a much lower quantum limit than prior art lasers because of the quenching of the noise from spontaneous emission. A brief summary of the theory behind this quenching follows.

The following equations, relating to the present invention, were developed using the Langevin noise operator method. The relative phase between the two lasing modes or fields occupying the same lasing medium is generally represented by the following equation:

$$\Psi = (\nu_1 - \nu_2 - \nu_3)t + \theta_1(t) - \theta_2(t) - \phi_{ab} \qquad \text{Equation 3}$$

in which "$\theta_1(t)$" and "$\theta_2(t)$" are the slowly varying or diffusing phases of the two lasing modes, and "$\phi_{ab}$" is the relative phase between the atomic levels $|a\rangle$ and $|b\rangle$ which is determined by the phase of the external coherence inducing source field, $\phi\mu$. In the Hanle effect laser, $\nu_3$ is equal to zero and $\nu_1$ is equal or approximately equal to $\nu_2$. In the quantum beat laser, $\nu_3$ is equal or approximately equal to $\nu_1 - \nu_2$. Thus, the diffusing phases and their relative phase difference become the important factors. In the prior art, the phase difference is random. The present invention, on the other hand, fixes this phase difference. The electromagnetic fields in the present invention corresponding to the two laser modes and ($\vec{E}_1$ and $\vec{E}_2$) and the external coherence inducing source $\vec{E}_3$), are represented classically as follows:

$$\vec{E}_1 = \epsilon_1 e^{-i\nu_1 t - i\theta_1(t)} \qquad \text{Equation 4}$$

$$\vec{E}_2 = \epsilon_2 e^{-i\nu_2 t - i\theta_2(t)}, \qquad \text{Equation 5}$$

and $$\vec{E}_3 = \epsilon_3 e^{-i\nu_3 t - i\phi\mu} \qquad \text{Equation 6}$$

in which "E" is the amplitude, "$\nu$" is the frequency, "t" is the time, "$\theta$" is the drifting phase of the laser modes, and "$\phi\mu$" is the phase of the external coherence inducing source.

Note that the terms "$i\theta_1(t)$," "$i\theta_2(t)$" and "$i\phi\mu$" are present in the above equations due to phase drifts. In a perfect laser with no diffusion, these terms would be constant. Also note that, for the Hanle effect laser, $\nu_3$ is equal to zero, and $\nu_1$ and $\nu_2$ are equal or approximately equal.

The equations which determine the mean evolution of and the noise in the relative phase between the two lasing modes are:

$$\dot\Psi = \delta\Omega - \gamma\sin\Psi \quad \text{"signal"} \qquad \text{Equation 7}$$

and $$D(\psi) = \frac{\gamma}{4\bar{n}}(1 - \cos\psi) \quad \text{"noise"} \qquad \text{Equation 8}$$

in which "$\Psi$" is the relative phase between the laser modes and the external coherence inducing source, "$D(\Psi)$" is the diffusion rate of the relative phase angle $\Psi$ due to spontaneous emission, "$\gamma$" is the bandwidth, "$\bar{n}$" is the average number of photons in each segment of the lasing medium cavity, "$\delta\Omega$" is the difference in the cavity frequencies minus the external source frequency in the presence of the perturbation source ($\nu_1 - \nu_2 - \nu_3$) (for the Hanle Effect method, $\nu_3 = 0$ and $\nu_2 = \nu_1$), and "$\Psi$" is the relative phase as represented by Equation 3. Equation 7 governs the deterministic behavior of $\Psi$ and Equation 8 determines the noise in $\Psi$ due to spontaneous emission. Note that when $\Psi$ is equal to zero, $D(\Psi)$ is also equal to zero. Equation 7 implies that $\Psi$ is approximately equal to zero when $\delta\Omega$ is small, and therefore the noise due to spontaneous emission, $D(\Psi)$, vanishes or is quenched. So long as $\delta\Omega << \gamma$, $\Psi$ reaches a steady state value given by $$\psi_{ss} = \frac{\delta\Omega}{\gamma} \qquad \text{Equation 9}$$

and the diffusion rate has the approximate value, $$D(\psi) = \frac{\gamma}{4\bar{n}}\left[\frac{\delta\Omega^2}{2\gamma^2}\right], \qquad \text{Equation 10}$$

which is drastically reduced from the prior art spontaneous emission diffusion rate of $\gamma/4n$, because $$(\delta\Omega^2/2\gamma^2) << 1.$$

To summarize, the present invention comprises a method and systems for quenching the noise due to spontaneous emission by making the relative phase between the two laser modes approximately equal to zero. When $\Psi$ is approximately equal to zero, the spontaneous emission noise effect represented by $D(\Psi)$ also approaches zero. The use of the method of the invention provides means for improving the detection capabilities of laser systems.

EMBODIMENT 1

Hanle Effect Laser

In embodiment 1, neutral neon atoms as a gain medium for the correlated emission laser use transitions between one of the $2p^53p$ and one of the $2p^53s$ fine structure levels. Specifically, the upper level is the $^3P_1$ level and the lower level the $^1P_1$ level. A laser at 616 nanometers (nm) pumps the $^3P_1$ level from the metastable $^3P_0$ level (see FIG. 6). The resulting laser transition is at 660 nm. In the absence of an external magnetic field the upper level is composed of three degenerate in energy hyperfine sublevels. These are decomposed such that one ($m_j = +1$) of the upper sublevels is coupled to the ground state by right circularly polarized ($\sigma+$) light and the other ($m_j = -1$) by left circularly polarized ($\sigma-$) light. Note that the ground state is the $m_j = 0$ level of $^1P_1$. Then the two circular polarized components $\sigma+$ and $\sigma-$ of the linear polarized pump beam, as seen in FIG. 6, pump the upper level substates with $m_j = +1$ and $m_j = -1$, respectively. These then form the two upper levels of the Hanle correlated emission laser. The fact that they are pumped by a laser field insures that a coherent superposition of these levels has been prepared. Thus, two laser beams with the polarizations $\sigma+$ and $\sigma-$ from the transition to the $^1P_1$ $m_j = 0$ level have been obtained. The noise in the beat signal between the laser modes can be observed directly via a linear polarizer or a laser diode.

The metastable $^3P_0$ level is pumpable by a discharge. The two upper levels of the lasing transition are pumped from this level using a dye laser at 616 nm.

Care must be taken that collisions do not destroy the coherence between the two upper lasing levels before they have time to decay. This puts a constraint upon the pressure of the neon gas.

EMBODIMENT 2

Quantum Beat Laser

In the quantum beat laser embodiment the two upper levels of the lasing transition are nondegenerate in energy so that the resulting laser fields will have different frequencies. The same neon levels used in the Hanle effect embodiment can be used. See FIG. 2. In this embodiment, however, a magnetic field of a few tens of gauss must be applied to the gain medium so that the three sublevels of the upper ($^3P_1$) level split in energy with an energy separation $\Delta\omega$ as seen in FIG. 2 with the $m_j=+1$, $m_j=-1$ levels taken as the two upper levels of the quantum beat laser. The lower level of the lasing transitions will again be the $^1P_1$ ($m_j=0$) level.

In this embodiment the two lasing transitions will have different polarizations, $\sigma+$ and $\sigma-$, and be separated in frequency by $\Delta\omega$. There are several ways that the coherence between the two upper levels are achievable in this embodiment. The $m_j=+1$ sublevel of the upper lasing level can be pumped with a 616 nm dye laser from the metastable $^3P_0$ level as in the Hanle effect embodiment. A microwave field or modulation of the pump beam at frequency $\Delta\omega$ can then be applied to couple the $m_j=-1$ and $m_j=+1$ sublevels of the $^3P_1$ upper level and thus provide the correlation. In this embodiment the beat note between the two lasing transitions is free of spontaneous emission noise.

I claim:

1. A method for correlating spontaneous emissions in active laser systems comprising the steps of:

exciting atoms in a single lasing medium in at least two laser fields from a low atomic state into a coherent superposition of upper atomic states, wherein random noise is created by spontaneous emissions by some of the excited atoms within each of the laser fields; and correlating relative phase differences between the spontaneous emissions among the excited atoms within different laser fields to quench the noise created by the spontaneous emissions.

2. The invention of claim 1 comprising using a polarization inducing source to excite the atoms within each of the laser fields to upper atomic states having the same energy level but different polarization components than the atoms within the other laser field.

3. The invention of claim 1 comprising using a frequency inducing source to excite the atoms of each of the laser fields to distinguish an upper energy level in each laser field which emits at a frequency corresponding to its energy level, the emission frequency of the atoms of each laser field being different than the emission frequency of those of any other laser field.

4. An active laser system for correlating spontaneous emissions comprising:

a doubly resonant cavity comprising a plurality of laser fields, said plurality of laser fields occupying a single lasing medium;

coherence inducing means for exciting atoms within said plurality of laser fields within said cavity into a coherent superposition of upper atomic states, wherein random noise is created by spontaneous emissions by some of the excited atoms within said plurality of laser fields; and means for correlating said spontaneous emissions among said atoms from different ones of said plurality of laser fields to substantially eliminate said random noise.

5. The invention of claim 4 wherein said single lasing medium comprises helium-neon gas.

6. The invention of claim 4 wherein said coherence inducing means comprises a polarization inducing source for exciting the atoms of each laser field to a different energy level with a different emission frequency, each emission frequency corresponding to one of said different energy levels.

7. The invention of claim 6 wherein said polarization inducing source comprises an elliptically polarizing laser.

8. The invention of claim 4 wherein said coherence inducing means comprises a frequency inducing source for exciting the atoms of different laser fields to different energy levels having different emission frequencies corresponding to said different energy levels.

9. The invention of claim 8 wherein said frequency inducing source comprises a microwave source.

10. The invention of claim 8 wherein said frequency inducing source comprises an electric current.

* * * * *